(12) United States Patent
Shimizu et al.

(10) Patent No.: US 6,726,365 B2
(45) Date of Patent: Apr. 27, 2004

(54) FOIL TYPE FLUID BEARING

(75) Inventors: Norio Shimizu, Saitama (JP); Hitoshi Iwadate, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 23 days.

(21) Appl. No.: 10/166,738

(22) Filed: Jun. 12, 2002

(65) Prior Publication Data
US 2003/0012466 A1 Jan. 16, 2003

(30) Foreign Application Priority Data
Jun. 12, 2001 (JP) ........................................ 2001-177505

(51) Int. Cl.[7] .............................................. F16C 32/06
(52) U.S. Cl. ........................ 384/103; 384/104; 384/106
(58) Field of Search ................................ 384/103, 104, 384/106

(56) References Cited

U.S. PATENT DOCUMENTS

| | | | | |
|---|---|---|---|---|
| 4,133,585 A | * | 1/1979 | Licht | 384/103 |
| 4,415,280 A | | 11/1983 | Agrawal | 384/103 |
| 4,699,523 A | * | 10/1987 | Hagemeister | 384/103 |
| 5,658,079 A | * | 8/1997 | Struziak et al. | 384/106 |
| 5,902,049 A | | 5/1999 | Heshmat | 384/106 |
| 5,988,885 A | | 11/1999 | Heshmat | 384/106 |
| 6,450,688 B2 | * | 9/2002 | Matsushima | 384/103 |

* cited by examiner

*Primary Examiner*—Thomas R. Hannon
(74) *Attorney, Agent, or Firm*—Arent Fox Kintner Plotkin & Kahn, PLLC

(57) ABSTRACT

The disclosed invention relates to a foil type fluid bearing including a foil assembly. The foil assembly supports a journal within a stationary retaining member and includes a top foil that is disposed on the inside in the radial direction, three mid foil layers that are disposed outside the top foil, and corrugated bump foils disposed outside the mid foil layers. When the journal is radially displaced, a large frictional damping force is generated between the three mid foil layers, thereby enhancing the function of supporting the journal. Moreover, layering the three mid foil layers can increase the rigidity against a load in the radial direction, thus preventing the top foil from deforming in a wavelike manner and thereby allowing the function of the foil type fluid bearing to be reliably exhibited.

13 Claims, 12 Drawing Sheets

FOIL TYPE FLUID BEARING

BACKGROUND OF THE INVENTION

1. Field of the Invention

The present invention relates to a radial type dynamic pressure fluid bearing (also commonly known as a 'hydrodynamic bearing'), and particularly to a foil type fluid bearing that includes a stationary retaining member that surrounds the outer circumference of a rotating journal so as to form an annular gap therebetween and a foil assembly which is positioned in the gap and supports the journal.

2. Description of the Related Art

A conventional foil type fluid bearing is known in, for example, U.S. Pat. Nos. 4,415,280, 5,902,049, and 5,988,885.

FIG. 12 shows a basic structure of the above-mentioned conventional foil type fluid bearing B. The foil type fluid bearing B includes a cylindrical stationary retaining member 02, and a foil assembly disposed in a gap between a rotating journal 01 and the retaining member 02 and supporting the journal 01. The foil assembly includes, going from the inside to the outside in the radial direction, an annular top foil 03, an annular mid foil 04, and corrugated bump foils 05.

Radial displacement of the rotating journal 01, which is supported by the fluid pressure within the foil assembly, generates frictional damping forces on the sliding faces of the top foil 03 and the mid foil 04, on the sliding faces of the mid foil 04 and the bump foils 05, and on the sliding faces of the bump foils 05 and the stationary retaining member 02, thereby suppressing vibration of the journal 01. However, since the above-mentioned conventional arrangement employs only one mid foil 04, it is difficult to generate a sufficient level of frictional damping force, leading to a possibility that the journal 01 might undergo a damaging resonance phenomenon.

The top foil 03 positioned in the innermost layer of the foil assembly receives a radially outward load from the fluid that is present between the top foil 03 and the journal 01, and this load is transmitted from the top foil 03 to the stationary retaining member 02 via the mid foil 04 and the bump foils 05. Since the corrugated bump foils 05 support the outer circumference of the mid foil 04 at a plurality of support points 5a, which are arranged in the circumferential direction at fixed intervals, in some cases the above-mentioned radially outward load causes the top foil 03 and the mid foil 04 to bend radially outward between the above-mentioned plurality of support points 05a. In this way, a wavelike deformation of the top foil 03 and the mid foil 04 not only prevents sliding, which generates the frictional damping forces, between the foils, but also makes it difficult to form a wedge shape, which generates a pressure to float the journal 01, between the top foil 03 and the journal 01, and there is therefore a possibility that the function of the foil type fluid bearing B might be adversely affected. FIG. 12 illustrates the deformation of the top foil 03 and the mid foil 04 in an exaggerated manner.

SUMMARY OF THE INVENTION

The present invention has been carried out in view of the above-mentioned circumstances, and it is an object of the present invention to generate a sufficient level of frictional damping force in a foil assembly of a foil type fluid bearing, and to prevent a top foil from being deformed in a wavelike manner due to the pressure of the fluid that is present between a journal and the top foil.

In order to accomplish the above-mentioned object, in accordance with a first aspect of the present invention, there is proposed a foil type fluid bearing that includes a stationary retaining member surrounding the outer periphery of a rotating journal so as to form an annular gap therebetween, and a foil assembly disposed in the gap and supporting the journal. The foil assembly includes a top foil, a mid foil section, and a corrugated bump foil disposed between the mid foil section and the stationary retaining member. One end of the top foil that faces a slit formed in the axial direction is fixed to the stationary retaining member. The top foil is wound in a cylindrical manner from the one end to the other end and supports the outer circumference of the journal via a fluid film layer. One end of the mid foil section that faces a slit formed in the axial direction is fixed to the stationary retaining member and the mid foil section being wound in a cylindrical manner from the one end to the other end. The inner circumference of the mid foil section is in frictional contact with the outer circumference of the top foil in a slidable manner, thereby generating a frictional damping force that counteracts a radially outward movement of the journal. The mid foil section includes at least two mid foils, which are superimposed on each other in a slidable manner so as to be in frictional contact with each other.

In accordance with the above-mentioned arrangement, with regard to the foil type fluid bearing in which the foil assembly including the top foil, the mid foil section and the bump foil is disposed between the stationary retaining member and the journal. Since the mid foil section includes at least two mid foils superimposed on each other in a slidable manner so as to be in frictional contact, when the journal moves in the radial direction, a large frictional damping force can be generated between the plurality of the mid foils, thereby enhancing the function of supporting the journal. Moreover, since the plurality of the mid foils are superimposed on each other, the rigidity against a load in the radial direction is enhanced, thus preventing the top foil from being deformed in a wavelike manner and thereby allowing the function of the foil type fluid bearing to be exhibited reliably.

Furthermore, in addition to the above-mentioned first aspect, in accordance with another aspect of the present invention, there is proposed a foil type fluid bearing wherein the plurality of the mid foils forming the mid foil section are all wound in the same direction.

In accordance with the above-mentioned arrangement, since the plurality of the mid foils are all wound in the same direction, they can be integrated into an assembly in advance and mounted together in the stationary retaining member, thereby contributing to a reduction in the number of assembly steps.

Furthermore, in addition to the above-mentioned first aspect, in accordance with another aspect of the present invention, there is proposed a foil type fluid bearing, wherein at least one mid foil among the plurality of the mid foils forming the mid foil section is wound in the opposite direction to that in which the other mid foils are wound.

In accordance with the above-mentioned arrangement, since at least one mid foil among the plurality of the mid foils is wound in the opposite direction to that in which the other mid foils are wound, it is possible to increase the amount of sliding between the mid foils that are wound in different directions, thereby generating a higher level of frictional damping force.

Furthermore, in addition to the above-mentioned aspect, in accordance with another aspect of the present invention, there is proposed a foil type fluid bearing wherein the mid foil in the innermost layer among the plurality of the mid foils forming the mid foil section is wound in the same direction as that in which the top foil is wound.

In accordance with the above-mentioned arrangement, since the mid foil in the innermost layer and the top foil are wound in the same direction, they can be integrated into an assembly in advance and mounted together in the stationary retaining member, thereby contributing to a reduction in the number of assembly steps.

Furthermore, in addition to the above-mentioned aspect, in accordance with another aspect of the present invention, there is proposed a foil type fluid bearing wherein the mid foil in the innermost layer among the plurality of the mid foils forming the mid foil section is wound in the opposite direction to that in which the top foil is wound.

In accordance with the above-mentioned arrangement, since the mid foil in the innermost layer is wound in the opposite direction to that of the top foil, it is possible to increase the amount of sliding between the mid foil and the top foil, which are wound in different directions, thereby generating a higher level of frictional damping force.

Furthermore, in addition to any one of the above-mentioned aspects, in accordance with yet another of the present invention, there is proposed a foil type fluid bearing wherein at least one part of the mid foil in the outermost layer among the plurality of the mid foils forming the mid foil section is formed from a material that is thicker than that used for the other mid foils.

In accordance with the above-mentioned arrangement, since at least one part of the mid foil in the outermost layer is formed from a material that is thicker than that used for the other mid foils, it is possible to prevent the top foil from being deformed in a wavelike manner due to the load from a fluid pressure, thereby allowing the function of the foil type fluid bearing to be exhibited reliably.

Furthermore, in addition to any one of the above-mentioned aspects, in accordance with another aspect of the present invention, there is proposed a foil type fluid bearing wherein at least one part of the mid foil in the outermost layer among the plurality of the mid foils forming the mid foil section is formed from a material that is harder than that used for the other mid foils.

In accordance with the above-mentioned arrangement, since at least one part of the mid foil in the outermost layer is formed from a material that is harder than that used for the other mid foils, it is possible to prevent the top foil from being deformed in a wavelike manner due to the load from a fluid pressure, thereby allowing the function of the foil type fluid bearing to be exhibited reliably.

Furthermore, in addition to any one of the above-mentioned aspects, in accordance with yet another aspect of the present invention, there is proposed a foil type fluid bearing wherein at least one area of the inner circumference of the top foil is coated, and the coated area has a coefficient of friction that is lower than that of any of the other sliding faces of the foil assembly.

In accordance with the above-mentioned arrangement, since the coefficient of friction of the coating applied to said at least one area of the inner circumference of the top foil is lower than that of any of the other sliding faces of the foil assembly, it is possible to start rotation of the journal smoothly and prevent the occurrence of any abnormality such as burning.

Furthermore, in addition to the above-mentioned aspect, in accordance with another aspect of the present invention, there is proposed a foil type fluid bearing wherein the coating is carried out using diamond-like carbon (DLC).

In accordance with the above-mentioned arrangement, since at least one area of the inner circumference of the top foil is coated using DLC, it is possible to reliably prevent damage to the inner circumference of the top foil due to friction between the top foil and the journal.

Furthermore, in addition to the above-mentioned aspect, in accordance with another aspect of the present invention, there is proposed a foil type fluid bearing wherein the coating is carried out using Polytetrafluoroethylene (PTFE).

In accordance with the above-mentioned arrangement, since at least one area of the inner circumference of the top foil is coated using PTFE, it is possible to reliably prevent damage to the inner circumference of the top foil due to friction between the top foil and the journal.

Furthermore, in addition to any one of the above-mentioned aspects, in accordance with yet another aspect of the present invention, there is proposed a foil type fluid bearing wherein a metal layer coating is applied to at least one area of the inner circumference of the stationary retaining member and the sliding faces of the foil assembly other than the inner circumference of the top foil.

In accordance with the above-mentioned arrangement, since a metal layer coating is applied to at least one area of the inner circumference of the stationary retaining member and the sliding faces of the foil assembly other than the inner circumference of the top foil, the frictional damping force of the foil assembly can be increased.

The above-mentioned object, other objects, characteristics and advantages of the present invention will become apparent from an explanation of preferred embodiments that will be described in detail below by reference to the attached drawings.

BRIEF DESCRIPTION OF THE DRAWINGS

FIG. 1 is a transverse cross section of a foil type fluid bearing.

FIG. 2 is a magnified view of part 2 in FIG. 1.

FIG. 3 is a magnified view of part 3 in FIG. 1.

FIG. 4 is a graph showing the relationship between the rotational speed of the journal and the oscillation amplitude of the journal.

FIG. 5 is a diagram showing the relationship between the resonant frequency and the coefficient of damping as the number of mid foils in a foil type fluid bearing varies.

FIG. 6 is a transverse cross section of a foil type fluid bearing.

FIG. 7 is a magnified view of part 7 in FIG. 6.

FIG. 8 is a transverse cross section of a foil type fluid bearing.

FIG. 9 is a magnified view of part 9 in FIG. 8.

FIG. 10 is a transverse cross section of a foil type fluid bearing.

FIG. 11 is a magnified view of part 11 in FIG. 10.

DESCRIPTION OF PREFERRED EMBODIMENTS

Embodiments of the present invention are explained below by reference to the attached drawings.

Figure 1:
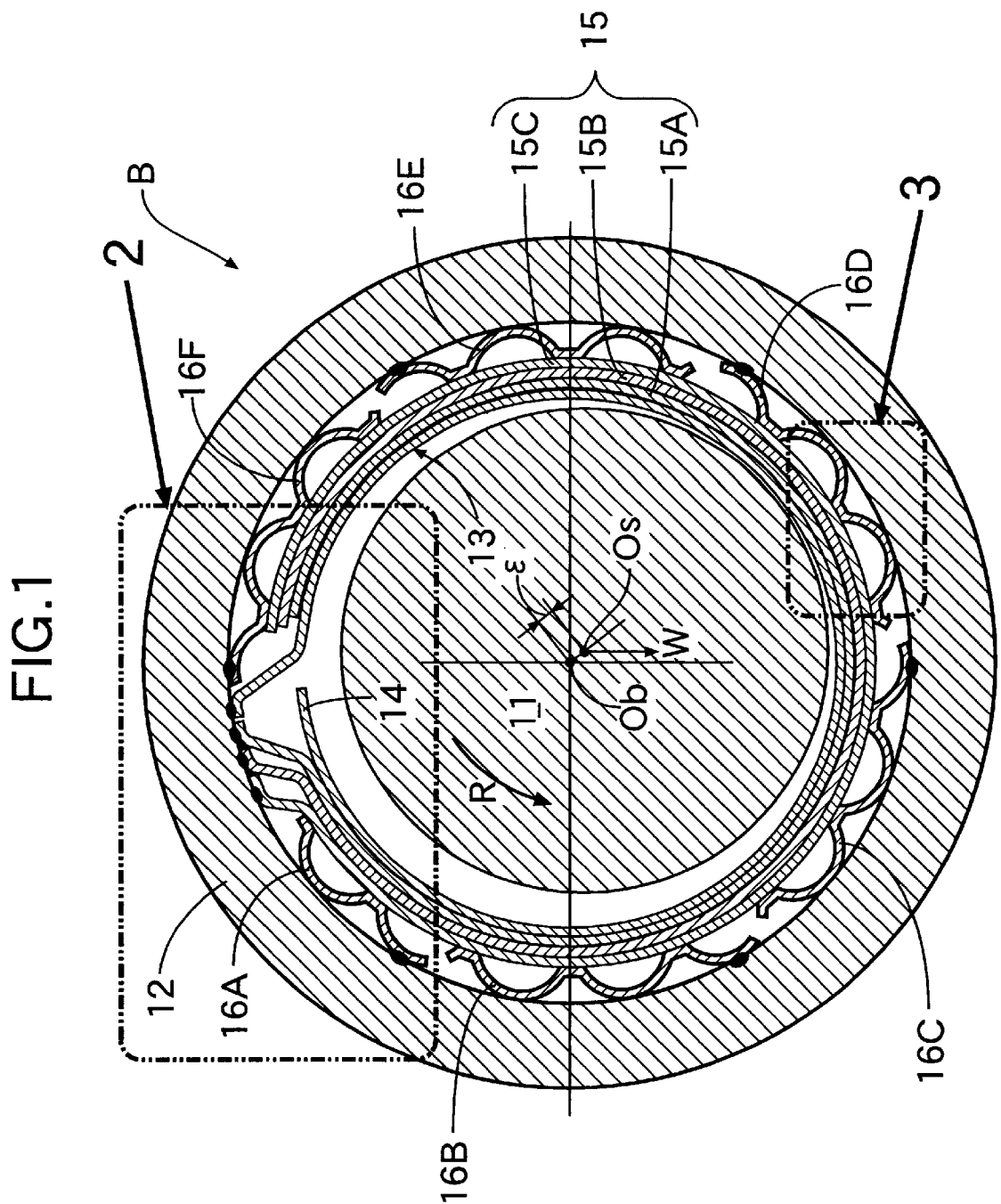
FIGS. 1 to 5 show a first embodiment of the present invention.
Figure 2:
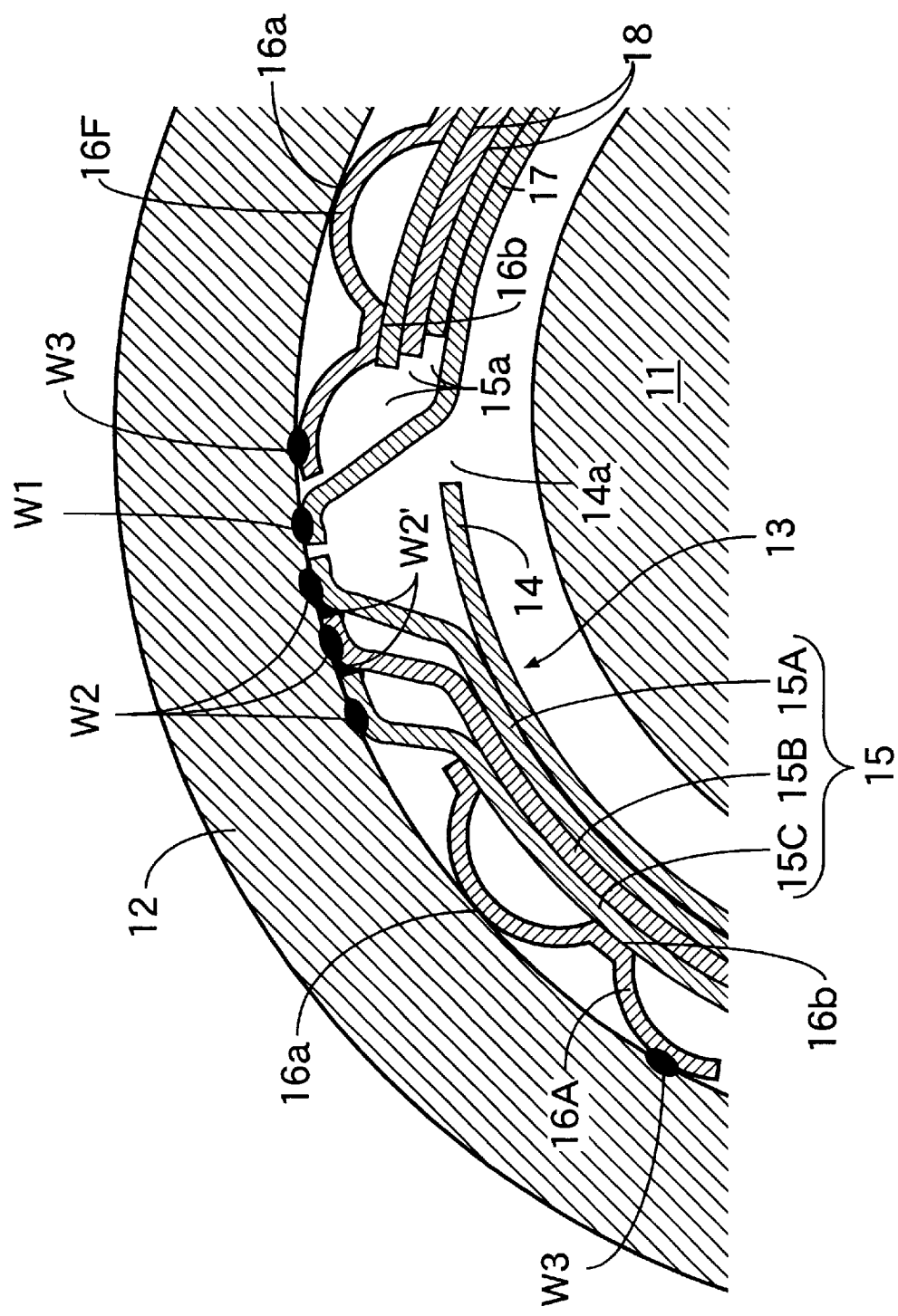
Figure 3:
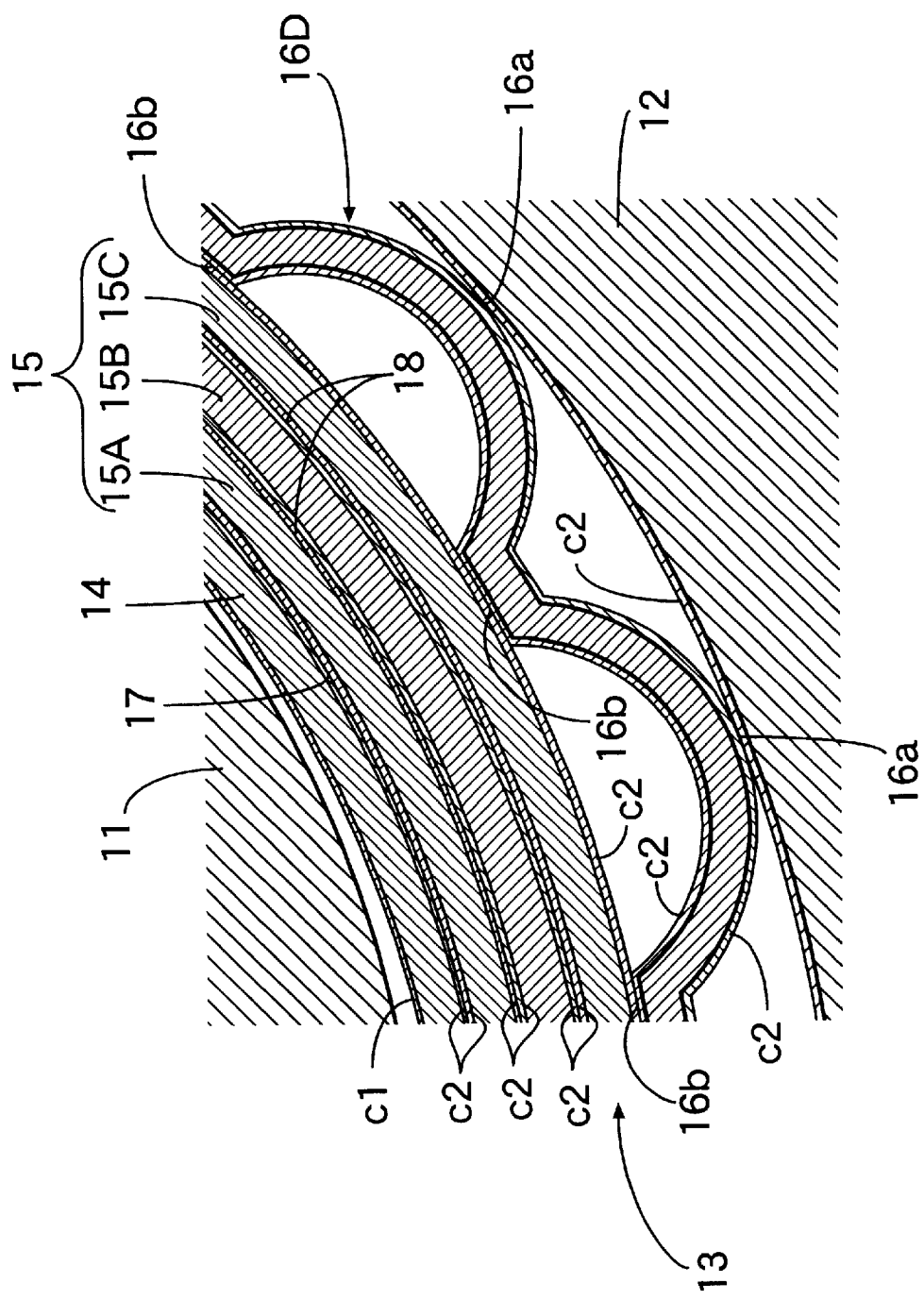

As shown in FIGS. 1 to 3, a foil type fluid bearing B for rotatably supporting a journal 11 having a circular cross section includes a cylindrical stationary retaining member 12 that is fixed in a non-rotatable manner so as to surround the outer circumference of the journal 11, and a foil assembly 13 that is disposed in an annular gap formed between the inner circumference of the stationary retaining member 12 and the outer circumference of the journal 11. The foil assembly 13 includes a top foil 14 that is disposed on the inside in the radial direction, a mid foil section 15 that is formed from three mid foils 15A, 15B, and 15C and disposed outside the top foil 14, and six bump foils 16A to 16F that are disposed outside the mid foil section 15 so as to be separate from each other in the circumferential direction. The top foil 14, the mid foils 15A, 15B, and 15C, and the bump foils 16A to 16F are made from thin metal sheet having a thickness of about 0.1 mm. In the figures, the illustrated thicknesses of the top foil 14, the mid foils 15A, 15B, and 15C and the bump foils 16A to 16F are exaggerated.

The top foil 14 is formed by curving a flat sheet into a cylindrical shape, and one of the ends, the ends having between them a slit 14a, is welded with weld W1 to the upper part (relative to the direction of gravity) of the inner circumference of the stationary retaining member 12. Each of the three mid foils 15A, 15B, and 15C is formed by curving a flat sheet into a cylindrical shape, and one of the ends, the ends having between them a slit 15a, is welded with a weld W2, which is in the vicinity of the aforementioned weld W1 on the inner circumference of the stationary retaining member 12. The top foil 14 is wound in a clockwise direction from the end having weld W1 toward the other end, and each of the three mid foils 15A, 15B, and 15C is wound in a counterclockwise direction from the end having weld W2 toward the other end. The outer circumference of the top foil 14 and the inner circumference of the mid foil 15A in the innermost layer are in slidable contact with each other on the sliding face 17.

In the present embodiment, since the three mid foils 15A, 15B, and 15C are wound in the same direction, they can be welded in advance with welds W2' to form an assembly and then welded with welds W2 to the stationary retaining member 12, thereby enhancing the ease of assembly (see FIG. 2).

The six bump foils 16A to 16F each have one end thereof welded with a weld W3 to the inner circumference of the stationary retaining member 12. Each of the bump foils 16A to 16F is a corrugated member in which partial cylinder parts projecting radially outward are connected to each other, first contacts 16a that are formed on the extremities of the aforementioned partial cylinder parts are in contact with the inner circumference of the stationary retaining member 12 in a manner such that they can freely slide in the circumferential direction, and substantially flat second contacts 16b that are formed between adjacent partial cylinder parts are in contact with the outer circumference of the mid foil 15C in the outermost layer in a manner such that they can freely slide in the circumferential direction.

The top foil 14, the mid foils 15A, 15B, and 15C, and the bump foils 16A to 16F are made of a material having high hardness and excellent heat resistance, such as Hastelloy X, Inconel 600 or Inconel X750.

The inner circumference of the top foil 14, that is, the surface thereof that faces the journal 11, has a coating c1 of DLC (diamond-like carbon) or PTFE (polytetrafluoroethylene) having excellent lubrication properties (low coefficient of friction, surface smoothness, long wear life), thereby preventing the occurrence of abnormalities such as burning on the sliding faces before a stable fluid film layer is formed between the inner circumference of the top foil 14 and the journal 11 after the journal 11 starts rotating. By applying a coating c1 of DLC or PTFE not only on the inner circumference of the top foil 14 but also on the opposing outer circumference of the journal 11, excellent lubrication properties can be obtained.

A metal layer coating c2 of, for example, copper is applied to the outer circumference of the top foil 14 that faces the mid foil 15A in the innermost layer, the inner and outer circumferences of the three mid foils 15A, 15B, and 15C, the first and second contacts 16a and 16b of the bump foils 16A to 16F, and the inner circumference of the stationary retaining member 12, thus increasing the coefficient of friction of the sliding faces and thereby generating a large frictional damping force to counteract a displacement of the journal 11. The material used for the metal layer coating c2 is not limited to copper. Silver, gold, platinum, etc. may also be used. The coefficients of friction are 0.32 for silver, 0.46 for copper, 0.54 for gold and 0.56 for platinum. The material can be chosen according to the required coefficient of friction, but in the present embodiment copper is used because of its low cost and high durability. It is also possible to use, instead of pure copper, a diluted copper alloy such as Cu—Sn, Cu—Zn or Cu—Fe.

The journal 11 is rotatably supported with a slight clearance in the inner space of the foil assembly 13, that is, in the inner space of the substantially cylindrical top foil 14. Although the aforementioned clearance is about 20 μm on average, the clearance illustrated in the figures is exaggerated. When the journal 11, which receives a downward load W due to gravity, rotates in the direction of arrow R (counterclockwise direction) in an equilibrium position in which the center Os of the journal 11 is eccentrically displaced from the center Ob of the stationary retaining member 12 by a distance ε, the air that is present between the journal 11 and the top foil 14 is dragged by the journal 11 and thrust into the wedge-shaped space beneath the journal 11 thus generating a positive pressure, whereas a negative pressure is generated in the wedge-shaped space above the journal 11. The journal 11 is supported in a non-contact state within the foil assembly 13 in the aforementioned equilibrium position in which the force of the above-mentioned air is balanced by the load W.

When the journal 11 is displaced radially outward from the equilibrium position due to the action of an external force or a change in the force of the air, the foil assembly 13 is deformed by pressure from the journal 11 via the air film layer, and the frictional resistance of the sliding faces so caused generates a restoring force that inhibits the movement of the journal 11. The restoring force arising from the foil assembly 13 retains the journal 11 in the equilibrium position in a stable manner.

Application of a load to the top foil 14 caused by a radial displacement of the journal 11 from the equilibrium position compresses the bump foils 16A to 16F in the radial direction and spreads them in the circumferential direction, and accordingly the top foil 14 and the mid foils 15A, 15B, and 15C are also displaced radially outward. Since the top foil 14 and the mid foils 15A, 15B, and 15C are wound in opposite directions to each other, the top foil 14 and the mid foils 15A, 15B, and 15C slide in opposite directions to each other. As a result, a frictional force is caused on the sliding faces 17 between the top foil 14 and the mid foils 15A, 15B, and 15C, thereby generating a frictional damping force which counteracts the displacement of the journal 11. Furthermore, sliding occurs on the sliding faces 18 between the three mid foils 15A, 15B, and 15C, which are wound in the same direction, and the resulting frictional forces generate frictional damping forces that counteract the displacement of the journal 11.

With regard to the bump foils 16A to 16F, which are fixed via the welds W3 to the inner circumference of the stationary retaining member 12, the first contacts 16a thereof move so as to move away from the welded parts W3 and the second contacts 16b thereof similarly move so as to move away from the welded parts W3. As a result, a frictional force is generated between the first contacts 16a and the inner circumference of the stationary retaining member 12, and a frictional force is also generated between the second contacts 16b and the mid foil 15C in the outermost layer. The frictional forces applied to the first contacts 16a and the second contacts 16b generate a frictional damping force that counteracts the displacement of the journal 11.

Figure 4:
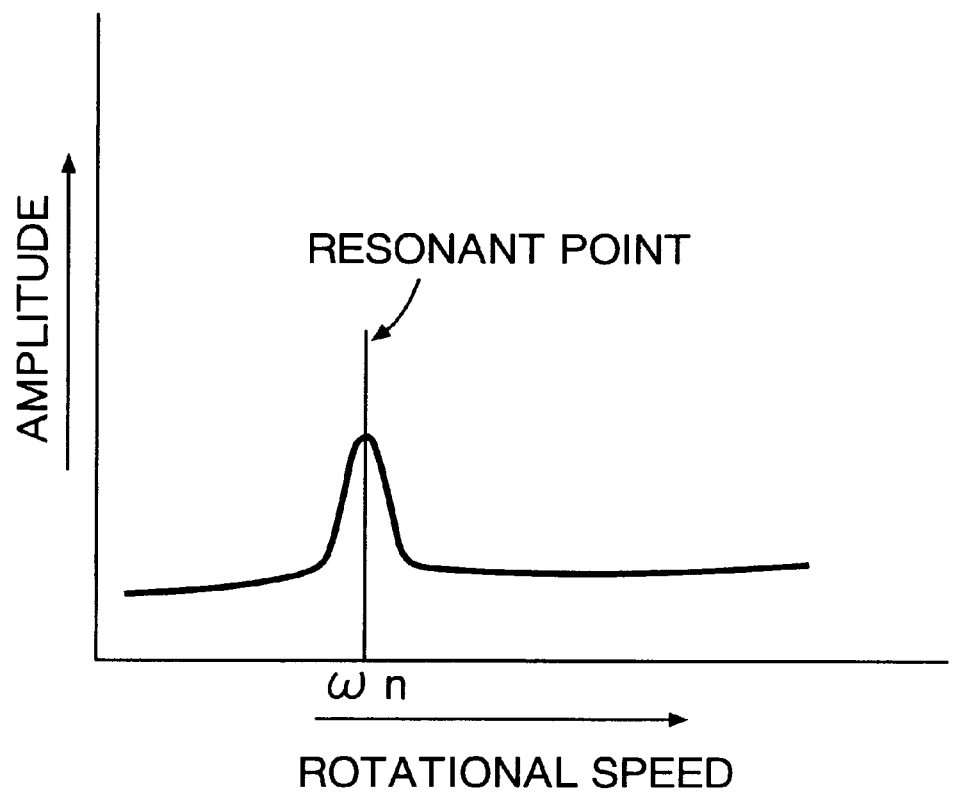

As shown in FIG. 4, it is known that when the rotational speed of the journal 11 increases and approaches the resonant point $\omega n$, a resonance phenomenon occurs in which the oscillation amplitude of the journal 11 rapidly increases. In order to effectively prevent this phenomenon, it is desirable that the damping coefficient of the frictional force from the foil assembly 13 increases linearly as the resonant frequency increases.

Figure 5:
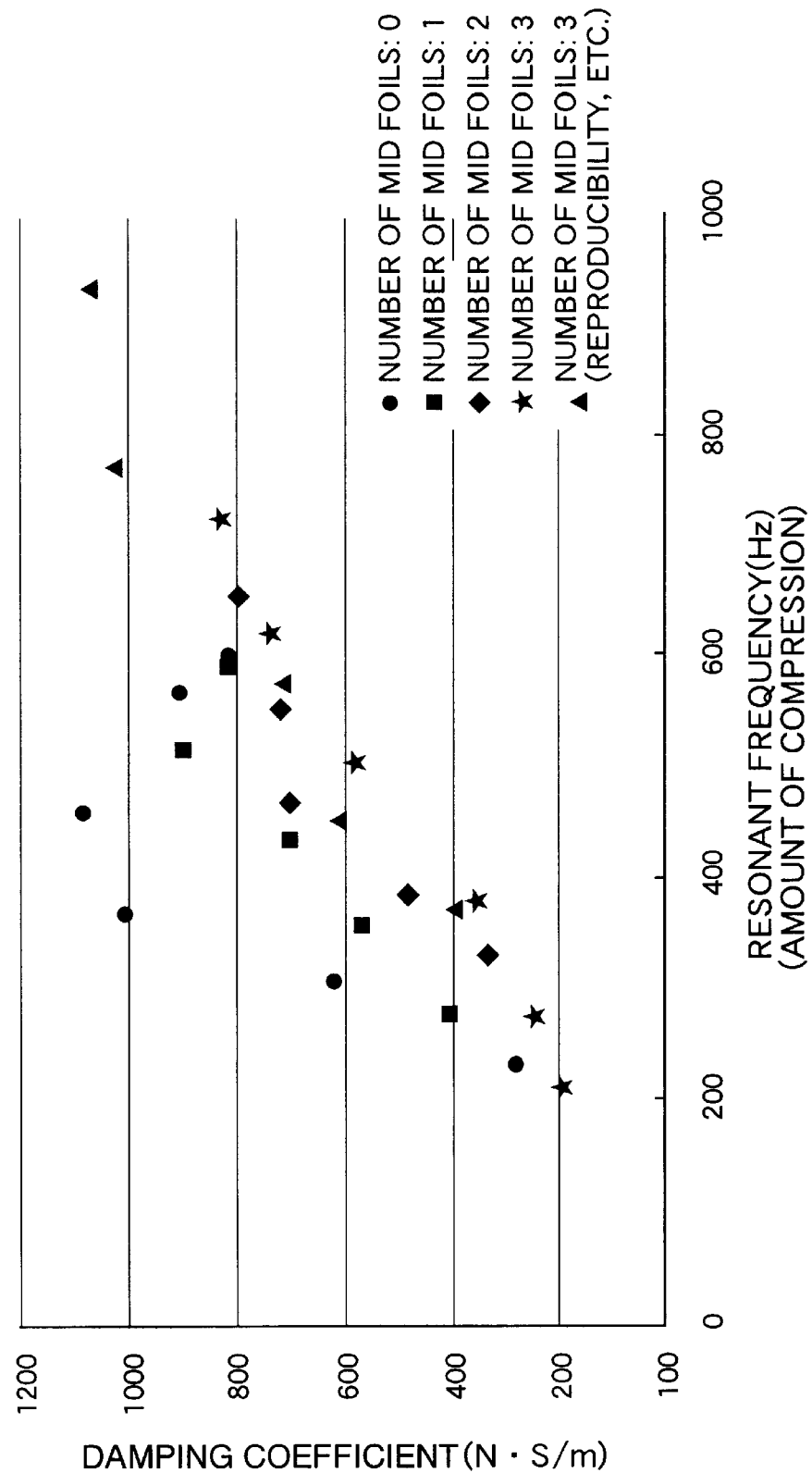

FIG. 5 shows the results of an examination of the relationship between the damping coefficient and the amount of compression of the foil type fluid bearing B caused by the journal 11 as the number of mid foils is varied in the range of 0 to 3. The 'resonant frequency' shown in FIG. 5 (more accurately, 'change in resonant frequency') indicates the amount of compression from the journal 11. As the amount of compression changes, the bearing rigidity increases (accompanying the deformation of the bumps), and the resonant frequency increases accordingly.

In the case in which no mid foil is used, the coefficient of damping increases at first as the resonant frequency (amount of compression) increases, but when the resonant frequency exceeds around 450 Hz the coefficient of damping starts decreasing and the linearity is lost. In the case in which one mid foil is used, in the same way as in the above-mentioned case, the coefficient of damping increases at first as the resonant frequency increases, but when the resonant frequency exceeds around 500 Hz the coefficient of damping starts decreasing and the linearity is lost. However, in the case in which two or three mid foils are used, the coefficient of damping increases steadily as the resonant frequency increases, and the linearity is higher for the case with three mid foils than it is for two mid foils.

Figure 12:
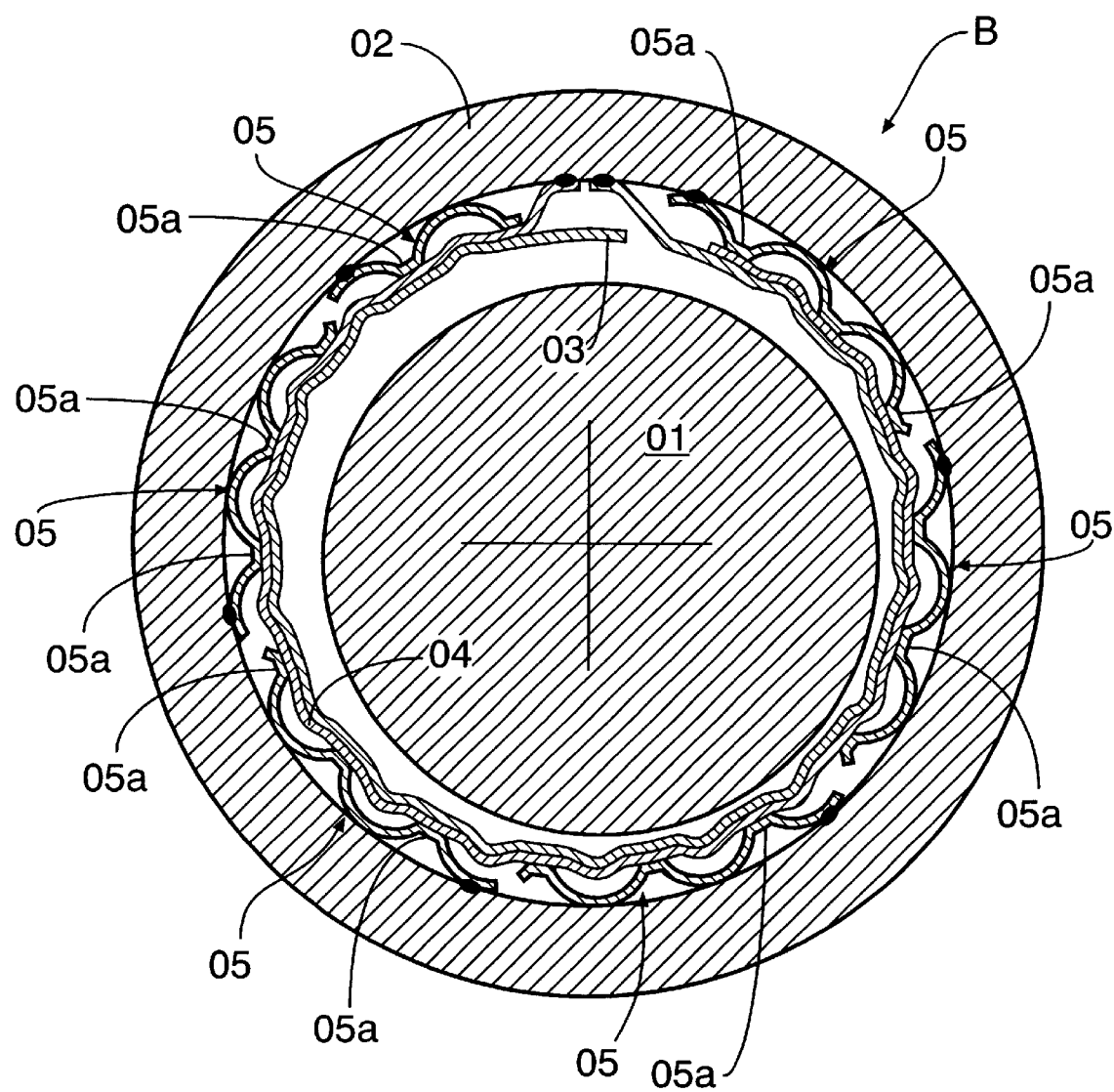
FIG. 12 is a transverse cross section of a conventional foil type fluid bearing.

As hereinbefore described, the action of the frictional damping forces acting between the plurality of the mid foils 15A, 15B, and 15C can appropriately maintain the characteristics of the frictional damping force relative to the resonant frequency, thereby effectively preventing the resonance phenomenon of the journal 11. Moreover, layering the plurality of the mid foils 15A, 15B, and 15C can prevent the top foil 14 and the mid foils 15A, 15B, and 15C from deforming in a wavelike manner between the second contacts 16b of the bump foils 16A to 16F when the top foil 14 and the mid foils 15A, 15B, and 15C receive a radially outward load (see FIG. 12), thus suppressing fluctuation in the thickness of the fluid film layer formed between the inner circumference of the top foil 14 and the outer circumference of the journal 11 and thereby allowing the function of the foil type fluid bearing B to be exhibited in a stable manner.

Figure 6:
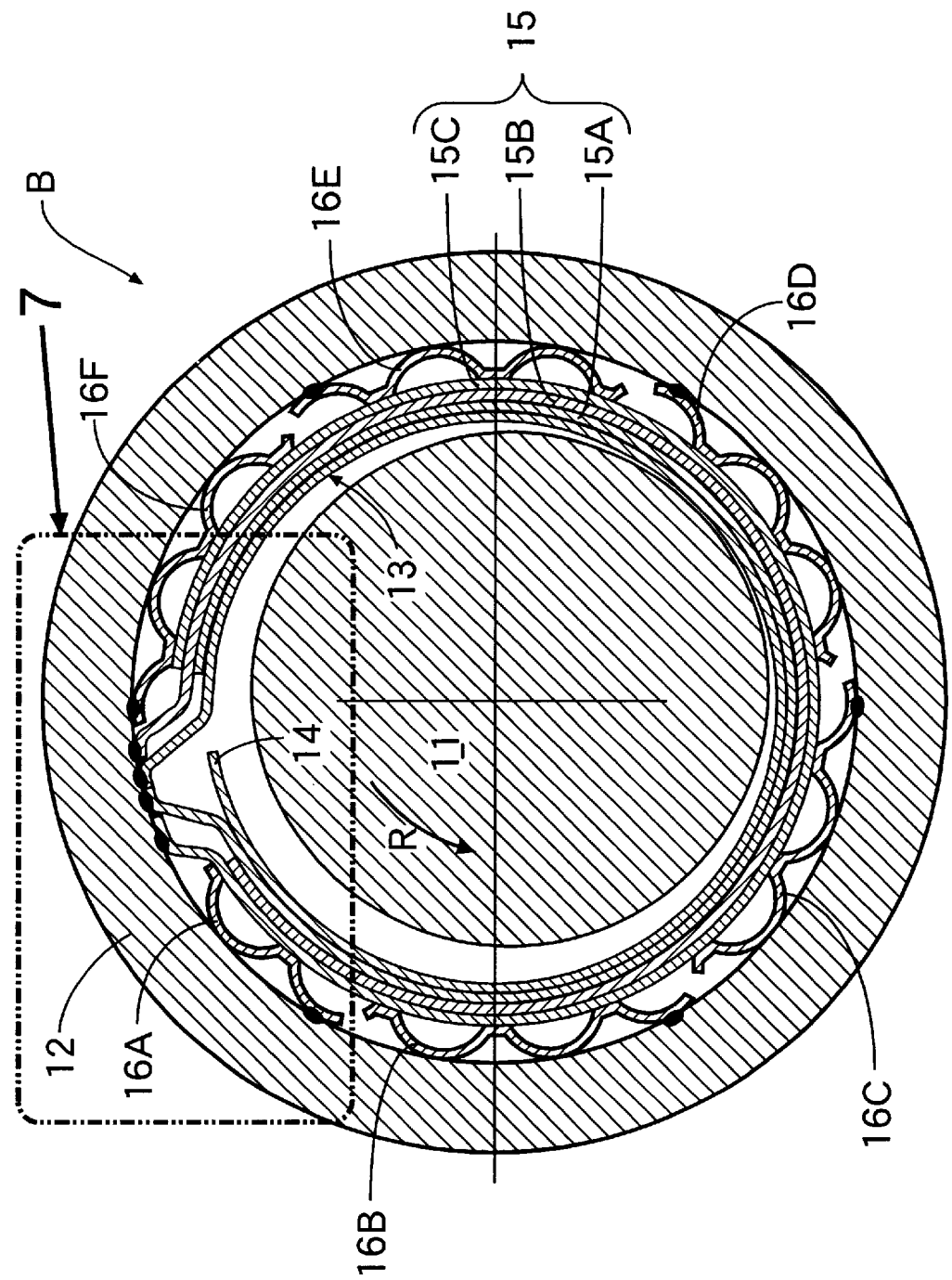
FIGS. 6 and 7 show a second embodiment of the present invention.
Figure 7:
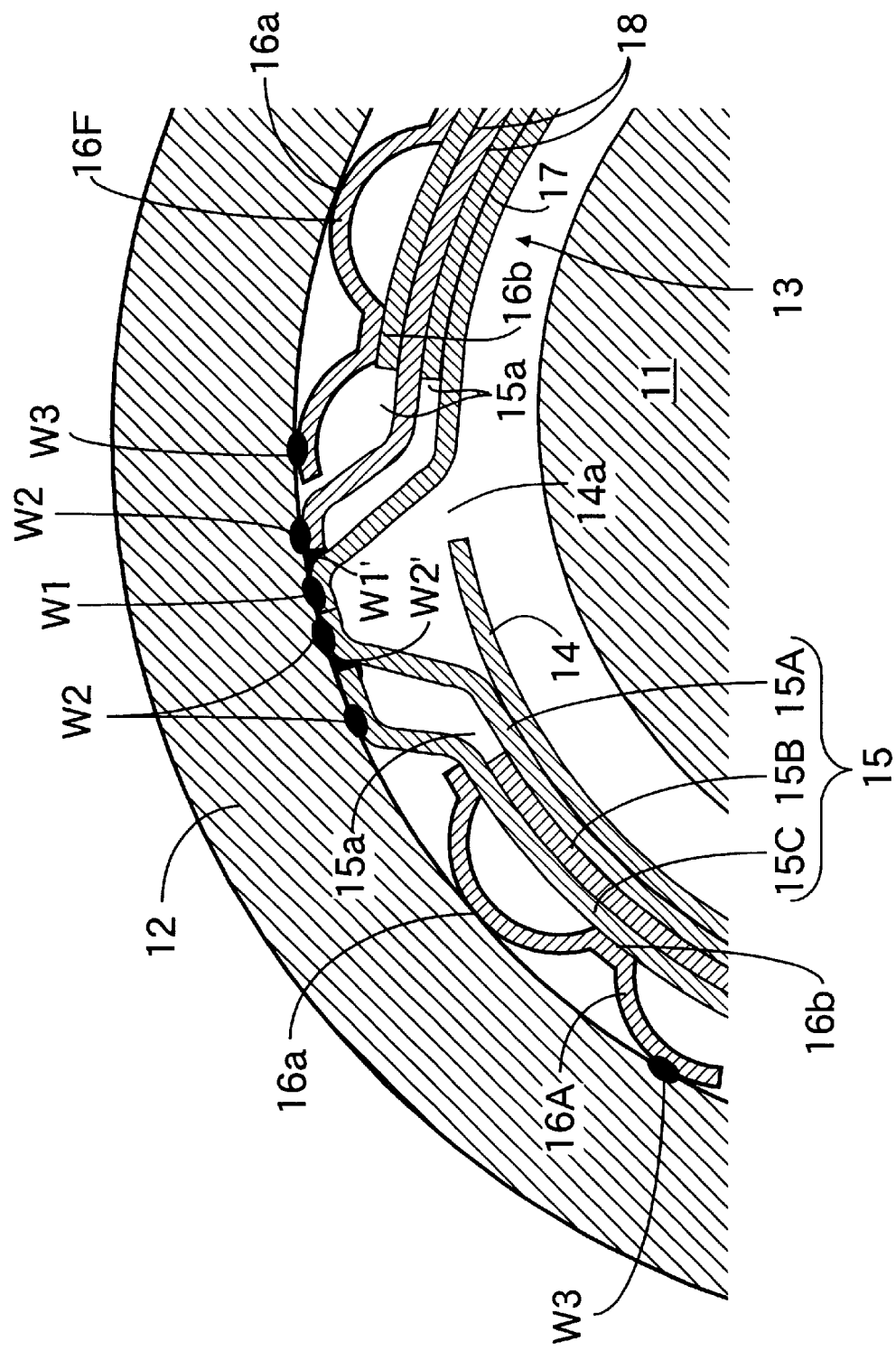

Next, the second embodiment of the present invention is explained by reference to FIGS. 6 and 7.

In the first embodiment, all the three mid foils 15A, 15B, and 15C were wound in a counterclockwise direction, but in the second embodiment, the mid foils 15A and 15C in the innermost and outermost layers are wound in a counterclockwise direction, and the mid foil 15B in the middle layer is wound in a clockwise direction. In other words, among the top foil 14 and the three mid foils 15A, 15B, and 15C, adjacent foils are wound in opposite directions to each other. When adjacent pairs among the top foil 14 and mid foils 15A, 15B, and 15C are wound in opposite directions to each other in this way, the amount of sliding when they are deformed becomes greater in comparison with the case where they are wound in the same direction, thereby generating a greater damping force.

Since the top foil 14 and the mid foil 15B in the middle layer are both wound in a clockwise direction, the top foil 14 and the mid foil 15B can be welded in advance with welded W1' to form an assembly and then welded with welds W1, W2 to the stationary retaining member 12, thereby enhancing the ease of assembly. Furthermore, since the mid foils 15A and 15C in the innermost and outermost layers are both wound in a counterclockwise direction, the mid foils 15A and 15C are welded with weld W2' in advance to form an assembly and then welded with weld W2 to the stationary retaining member 12, thereby enhancing the ease of assembly (see FIG. 7).

Figure 8:
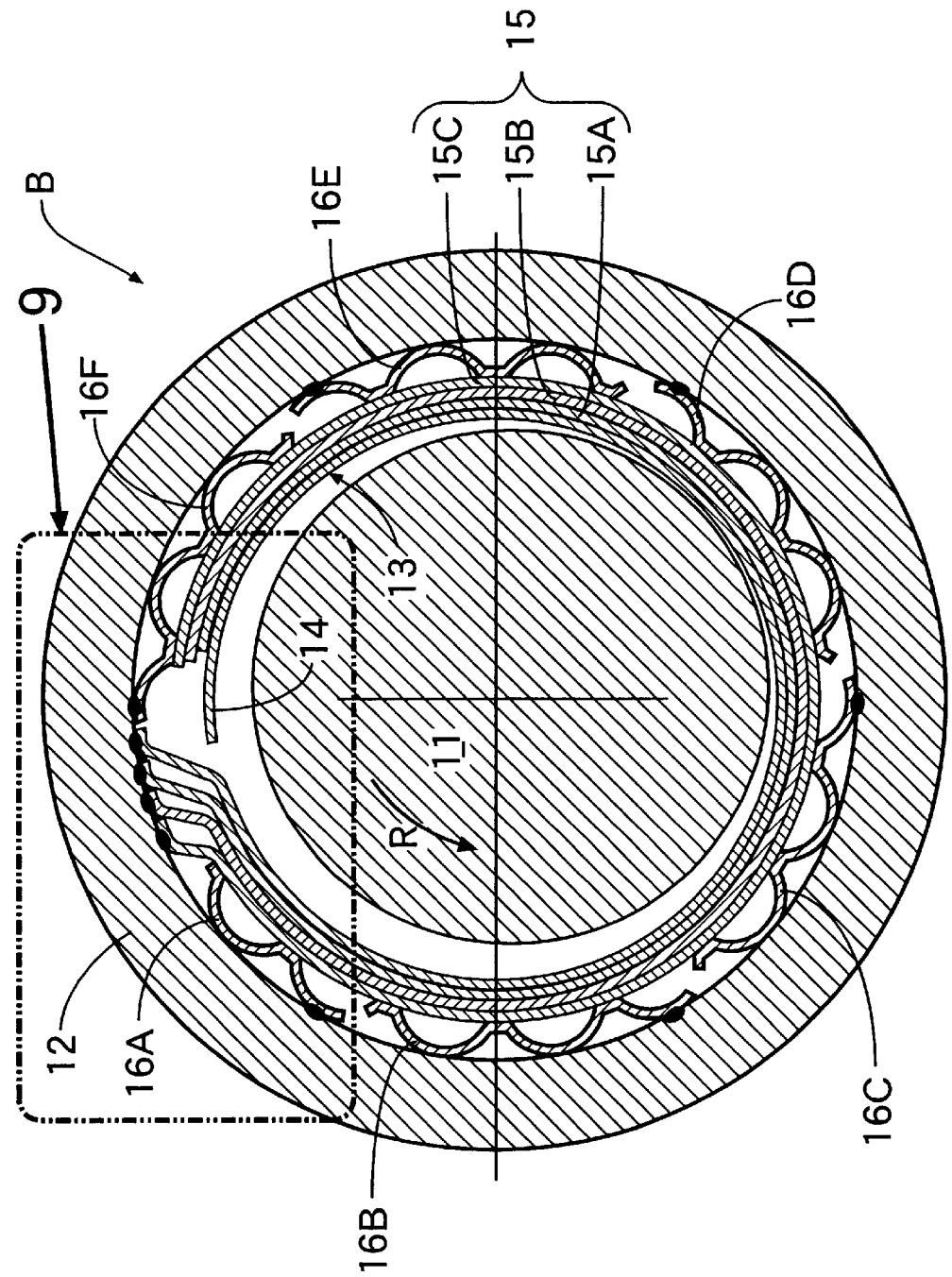
FIGS. 8 and 9 show a third embodiment of the present invention.
Figure 9:
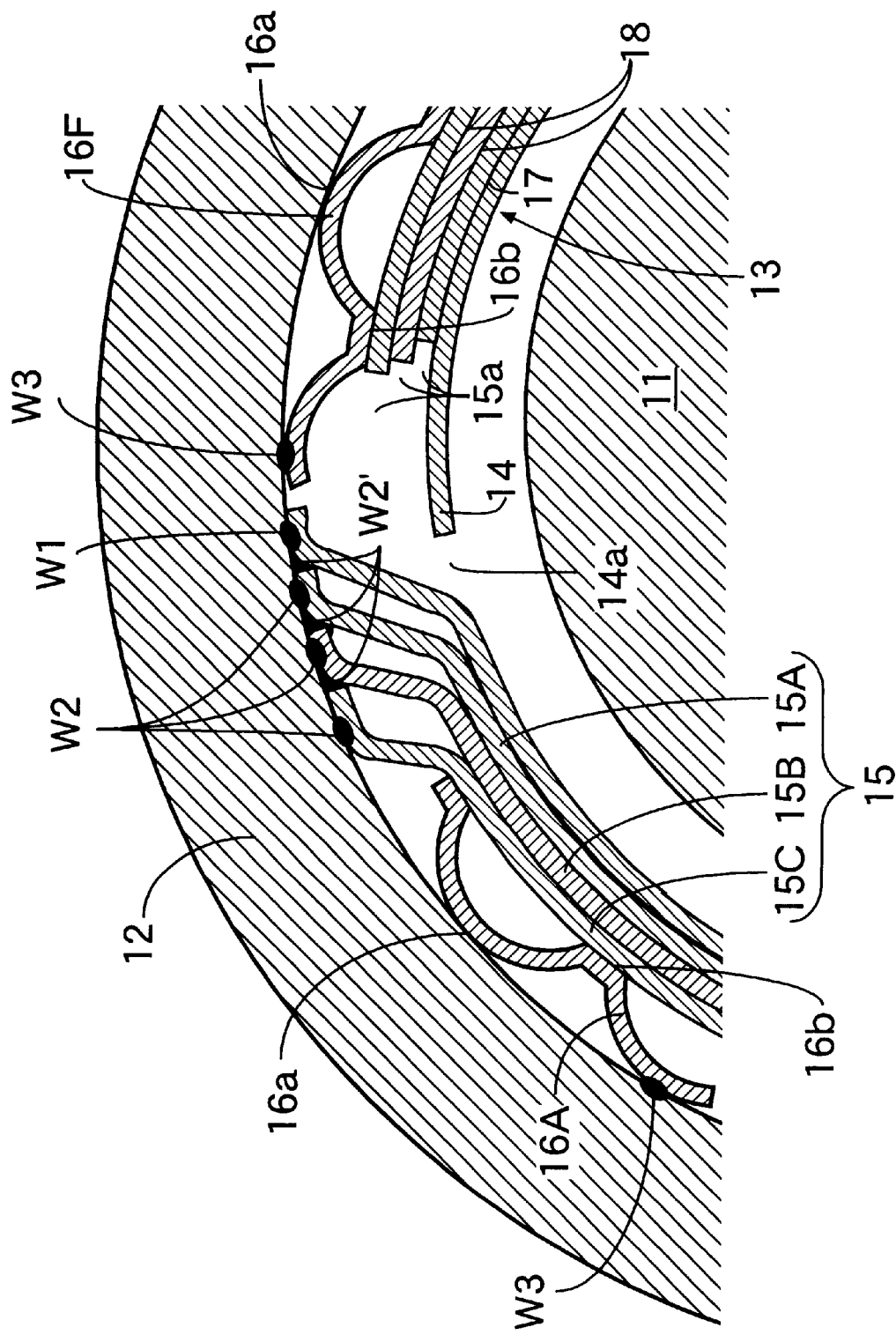

Next, the third embodiment of the present invention is explained by reference to FIGS. 8 and 9.

In the first embodiment, the top foil 14 is wound in a clockwise direction and the three mid foils 15A, 15B, and 15C are wound in a counterclockwise direction, but in the third embodiment, the top foil 14 and the three mid foils 15A, 15B, and 15C are all wound in a counterclockwise direction. It is therefore possible to enhance the ease of assembly by welding the top foil 14 and the three mid foils 15A, 15B, and 15C with welds W2' in advance to form an assembly and then welding the assembly to the stationary retaining member 12 with welds W1, W2, thereby enhancing the ease of assembly (see FIG. 9).

Figure 10:
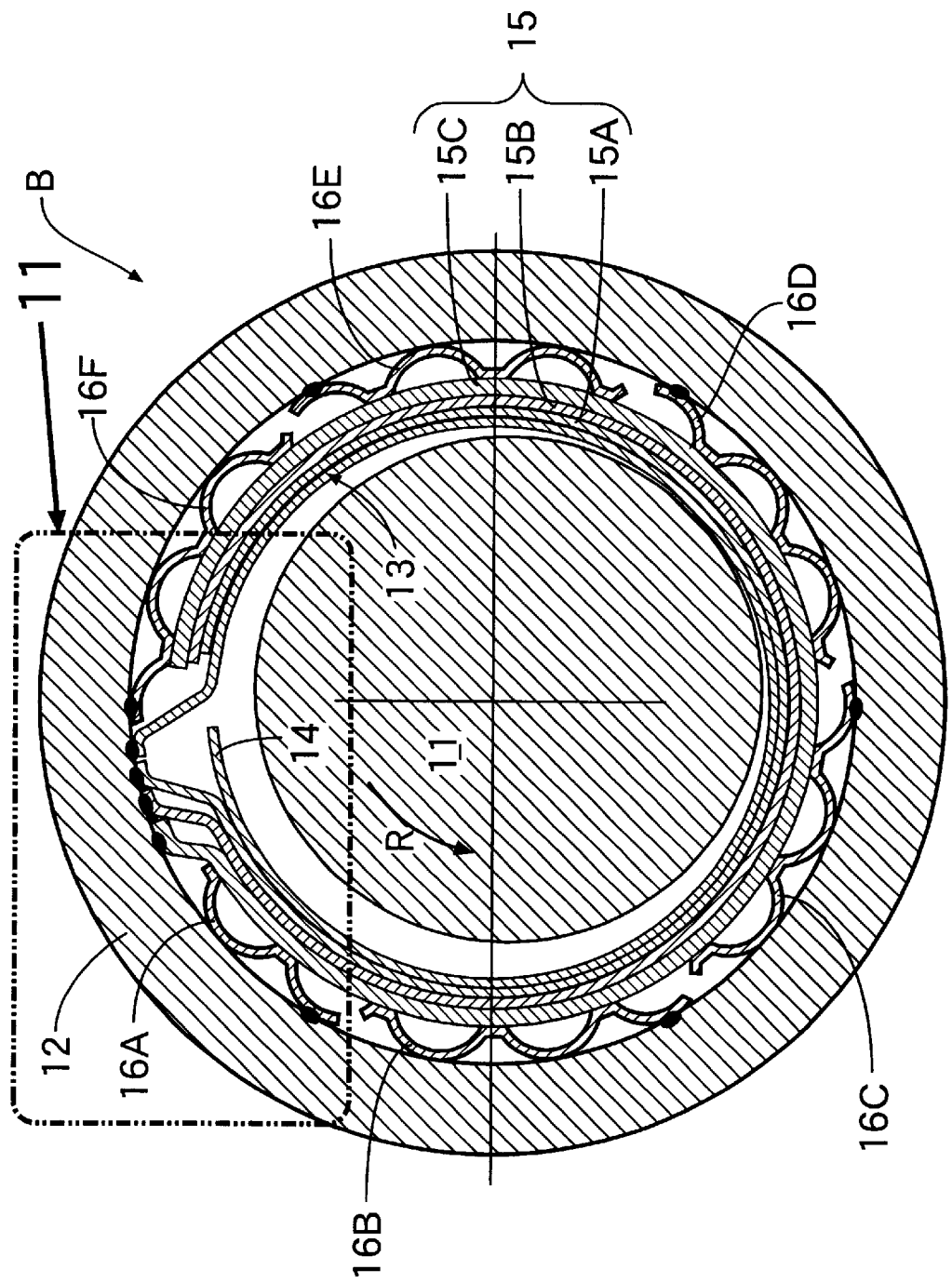
FIGS. 10 and 11 show a fourth embodiment of the present invention.
Figure 11:
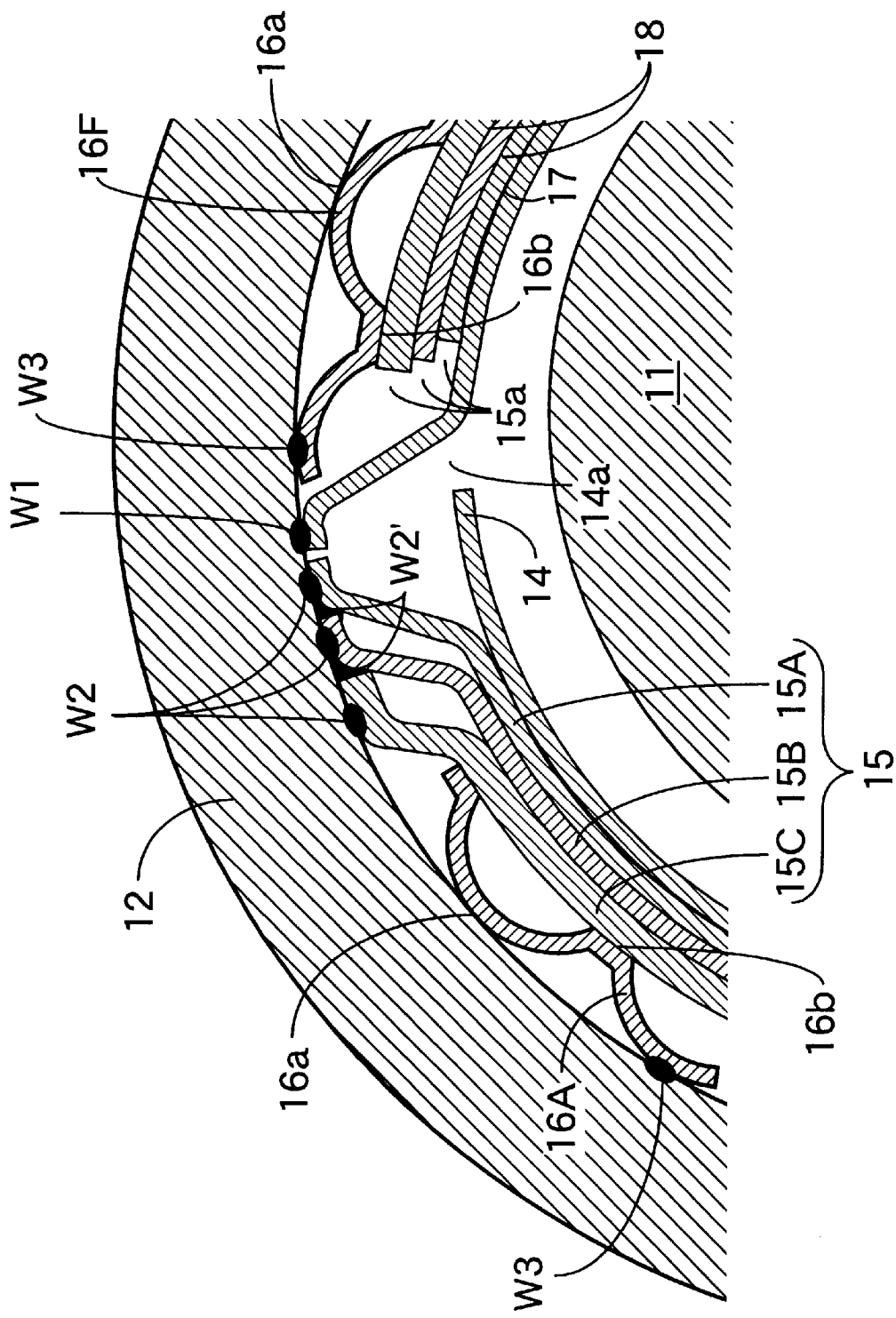

Next, the fourth embodiment of the present invention is explained by reference to FIGS. 10 and 11.

In the first embodiment, all the three mid foils 15A, 15B, and 15C were formed with the same thickness, but in the fourth embodiment, among the three mid foils 15A, 15B, and 15C, the mid foil 15C in the outermost layer is formed from a material that is thicker than that used to form the other two mid foils 15A and 15B. This prevents the mid foil 15C in the outermost layer from deforming in a wavelike manner between the second contacts 16b of the bump foils 16A to 16F, thus preventing the other two mid foils 15A and 15B and the top foil 14 from deforming and thereby securing the function of the foil type fluid bearing B.

The number of mid foils 15A, 15B, and 15C is not limited to three as in the above-mentioned embodiments, and it can be any number as long as it is at least two. Furthermore, the top foil 14 and the mid foils 15A, 15B, and 15C can be wound in any combination of directions in addition to those in the embodiments. Moreover, the division and the shape of the bump foils 16A to 16F are not limited to those in the embodiments.

Furthermore, it is unnecessary to apply the coating c1 of DLC or PTFE to the whole area on the inner circumference of the top foil 14, and it is sufficient to apply it to the section that faces the journal 11. Similarly, it is unnecessary to apply the coating c2 to the whole areas of the top foil 14, the mid foils 15A, 15B, and 15C, and the bump foils 16A to 16F, and it is sufficient to apply it only to the parts that slide against another member.

Furthermore, in the fourth embodiment the mid foil 15C in the outermost layer is made thicker than the other two mid foils 15A and 15B, but the same effect can be obtained by increasing the hardness of the mid foil 15C in the outermost layer relative to that of the other two mid foils 15A and 15B.

Although the present invention is explained in detail above, the present invention can be modified in a variety of ways without departing from the spirit and scope of the present invention.

What is claimed is:

1. A foil type fluid bearing including:
   a stationary retaining member that surrounds an outer periphery of a rotating journal so as to form an annular gap therebetween; and
   a foil assembly disposed in the gap and supporting the journal, the foil assembly comprising:
   a top foil having a first end and a second end opposite the first end, wherein the first end faces a slit formed in an axial direction and is fixed to the stationary retaining member, and wherein the top foil is wound in a cylindrical manner from the first end to the second end and supports an outer circumference of the journal via a fluid film layer;
   a mid foil section having a first end and a second end opposite the first end, wherein the first end faces a slit formed in an axial direction being fixed to the stationary retaining member and the mid foil section is wound in a cylindrical manner from the first end to the second end, and an inner circumference of the mid foil section is in frictional contact with the outer circumference of the top foil in a slidable manner, thereby generating a frictional damping force that counteracts a radially outward movement of the journal; and
   a corrugated bump foil disposed between the mid foil section and the stationary retaining member,
   wherein the mid foil section comprises a plurality of at least two mid foils, and
   wherein the mid foils are superimposed on each other in a slidable manner so as to be in frictional contact with each other.

2. The foil type fluid bearing according to claim 1, wherein the plurality of the mid foils forming the mid foil section are all wound in the same direction.

3. The foil type fluid bearing according to claim 1, wherein at least one mid foil among the plurality of the mid foils forming the mid foil section is wound in the opposite direction to that in which the other mid foils are wound.

4. The foil type fluid bearing according to either claim 2 or claim 3, wherein the mid foil in an innermost layer among the plurality of the mid foils forming the mid foil section is wound in the same direction as that in which the top foil is wound.

5. The foil type fluid bearing according to either claim 2 or claim 3, wherein the mid foil in an innermost layer among the plurality of the mid foils forming the mid foil section is wound in the opposite direction to that in which the top foil is wound.

6. The foil type fluid bearing according to any one of claims 1, 2 or 3, wherein at least one part of the mid foil in an outermost layer among the plurality of the mid foils forming the mid foil section is formed from a material that is thicker than that used for the other mid foils.

7. The foil type fluid bearing according to any one of claims 1, 2 or 3, wherein at least one part of the mid foil in an outermost layer among the plurality of the mid foils forming the mid foil section is formed from a material that is harder than that used for the other mid foils.

8. The foil type fluid bearing according to any one of claims 1, 2 or 3, wherein at least one area of an inner circumference of the top foil is coated, and the coated area has a coefficient of friction that is lower than that of any other sliding faces of the foil assembly.

9. The foil type fluid bearing according to claim 8, wherein the coating is carried out using diamond-like carbon (DLC).

10. The foil type fluid bearing according to claim 9, wherein at least one area of an inner circumference of the stationary retaining member and sliding faces of the foil assembly other than an inner circumference of the top foil has a metal layer coating applied thereto.

11. The foil type fluid bearing according to claim 8, wherein the coating is carried out using polytetrafluoroethylene (PTFE).

12. The foil type fluid bearing according to claim 11, wherein at least one area of an inner circumference of the stationary retaining member and sliding faces of the foil assembly other than an inner circumference of the top foil has a metal layer coating applied thereto.

13. The foil type fluid bearing according to any one of claim 1, 2 or 3, wherein at least one area of an inner circumference of the stationary retaining member and sliding faces of the foil assembly other than an inner circumference of the top foil has a metal layer coating applied thereto.

* * * * *